US006190258B1

(12) United States Patent
Heidenreich et al.

(10) Patent No.: US 6,190,258 B1
(45) Date of Patent: Feb. 20, 2001

(54) TORQUE LIMITER CLUTCH

(75) Inventors: David C. Heidenreich, Akron; Keith A. Nichols, North Canton, both of OH (US)

(73) Assignee: Power Transmission Technology, Inc., Sharon Center, OH (US)

( * ) Notice: Under 35 U.S.C. 154(b), the term of this patent shall be extended for 0 days.

(21) Appl. No.: 08/168,235

(22) Filed: Dec. 17, 1993

(51) Int. Cl.$^7$ .................................................. F16D 7/02
(52) U.S. Cl. .................................................. 464/48; 464/46
(58) Field of Search .............................. 464/30, 45, 46, 464/47, 48, 41

(56) References Cited

U.S. PATENT DOCUMENTS

| | | | | |
|---|---|---|---|---|
| 2,618,136 | * | 11/1952 | Wellauer | 464/48 |
| 2,655,015 | * | 10/1953 | Linder | 464/48 X |
| 2,702,619 | * | 2/1955 | Andershock | 464/48 X |
| 3,277,671 | * | 10/1966 | Winstone et al. | 464/46 X |
| 3,372,561 | * | 3/1968 | Howard et al. | 464/48 |
| 4,440,035 | * | 4/1984 | Foulk | 464/46 X |
| 4,445,876 | * | 5/1984 | Entrup | 464/48 |
| 4,661,083 | * | 4/1987 | Heidenreich et al. | 464/17 |
| 5,002,517 | * | 3/1991 | Heidenreich et al. | 464/48 |
| 5,119,995 | * | 6/1992 | Kohler et al. | 403/356 X |
| 5,129,497 | * | 7/1992 | Kelley | 464/48 X |
| 5,295,909 | * | 3/1994 | Heidenreich | 464/48 |

FOREIGN PATENT DOCUMENTS

| | | | | |
|---|---|---|---|---|
| 1 747 750 | * | 7/1992 | (RU) | 464/48 |
| 0 012 966 | * | 11/1990 | (WO) | 464/46 |

* cited by examiner

Primary Examiner—Donald P. Walsh
Assistant Examiner—William A. Rivera
(74) Attorney, Agent, or Firm—Renner, Kenner, Greive, Bobak, Taylor & Weber

(57) ABSTRACT

A multiple disc torque limiting clutch has an output hub in interference fit upon an output shaft. After being so assembled, as by a heat shrink fit, the output hub and shaft can be received by the remainder of the torque limiting clutch, consisting of interleaved friction discs and separator discs maintained between end plates. A pressure plate urges the friction discs and separator discs toward a fixed friction disc which is secured to the output hub. The force upon the pressure plate is attained by a Belleville spring and circumferentially spaced spring cup assemblies.

14 Claims, 2 Drawing Sheets

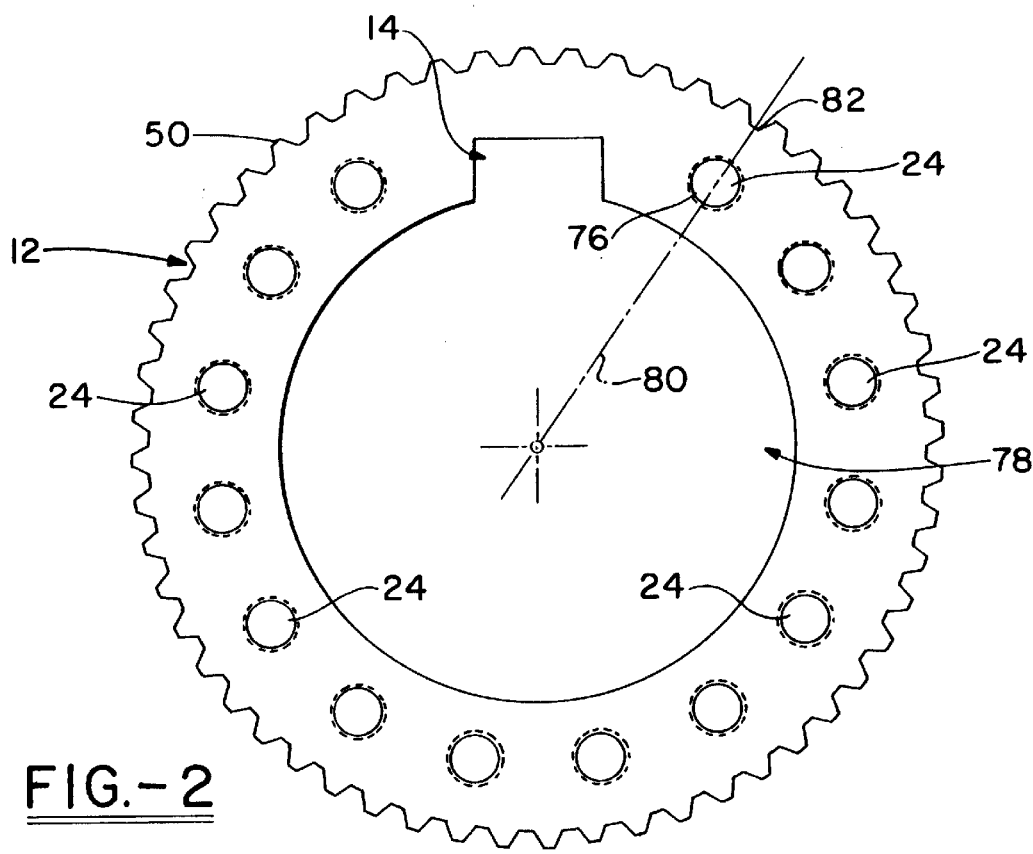
FIG.-2
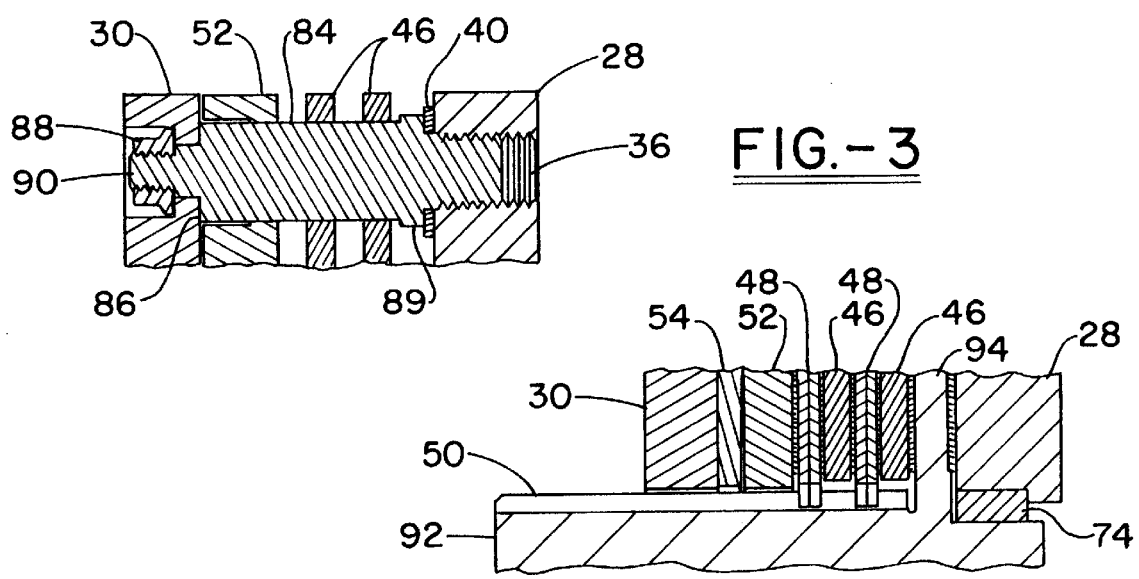
FIG.-3
FIG.-4

TORQUE LIMITER CLUTCH

TECHNICAL FIELD

The invention herein resides in the art of power transmission devices and, more particularly, to torque limiters. More specifically, the invention presents a multiple disc torque limiting clutch.

BACKGROUND ART

The use of torque limiting clutches between input power sources and output mechanisms is well known. Typically, a torque limiting clutch has a characteristic breakaway torque allowing slippage between input and output shafts or mechanisms when the torque on the shafts exceeds the characteristic breakaway torque of the clutch.

The prior art, while being generally effective in performing the requisite torque limiting functions, has demonstrated shortcomings in a number of areas. Particularly, increased ease of assembly and disassembly of such clutches is of continual concern. Additionally, the adaptability of one output shaft to any of plural clutches, as well as the adaptability of a single clutch to any of plural output shafts is most desirable.

Further, while the use of Belleville springs in torque limiting clutches has previously been known, it has not been known to employ a Belleville spring in conjunction with spring cup assemblies to achieve a torque limiting clutch having high breakaway torque characteristics, which characteristics may be grossly attained by implementation of the Belleville spring, and finely set by implementation of the spring cup assemblies.

Additionally, previously known torque limiting clutches have not been given to ease of separation of an output shaft and hub from the remainder of the clutch assembly and which particularly allow for such separable feature to accommodate a shrink fit or other interference fit between the output hub and the output shaft. Specifically, heat shrink fitting has typically been avoided in the prior art because the interconnection between the output hub and output shaft has generally been undertaken at a point when the torque limiting clutch assembly has been complete. At that point in time, heating of the output hub will likely cause damage to the friction elements, springs, and bearings of the clutch, an undesirable result.

DISCLOSURE OF INVENTION

In light of the foregoing, it is first aspect of the invention to provide a multiple disc torque limiting clutch which is characterized by ease of assembly and disassembly.

Another aspect of the invention is the provision of a multiple disc torque limiting clutch in which a single clutch may be adapted for implementation with any of numerous output shafts and hubs and, similarly, an output shaft and hub may be employed with any of numerous clutches.

Another aspect of the invention is the provision of a multiple disc torque limiting clutch which employs the combination of a Belleville spring and spring cup assemblies to establish the characteristic breakaway torque.

Another aspect of the invention is the provision of a multiple disc torque limiting clutch which allows for ease of separability of the output hub from the torque limiting clutch.

Yet an additional aspect of the invention is the provision of a multiple disc torque limiting clutch which allows for ease of heat shrink fitting or interference fitting of the output hub onto the output shaft.

Still a further aspect of the invention is the provision of a multiple disc torque limiting clutch which is reliable and durable in operation, compact in size, and economic to produce employing state of the art techniques and apparatus.

The foregoing and other aspects of the invention which will become apparent as the detailed description proceeds are achieved by a torque limiting clutch, comprising: first and second end plates maintained in fixed spaced apart relationship to each other; friction discs interleaved with separator discs between said first and second end plates; a pressure plate interposed between said first end plate and said interleaved friction discs and separator discs; spring means interposed between said first end plate and said pressure plate for urging said pressure plate toward said second end plate and urging said friction discs and separator discs into frictional contacting engagement with each other; an output shaft; and an output hub received upon said output shaft, said friction discs being splined to said output hub, said output hub and output shaft being separable from said friction discs as a unit.

Other aspects of the invention which will become apparent herein are attained by a torque limiting clutch assembly, comprising: first and second fixedly interconnected end plates; interleaved friction discs and separator discs maintained between said first and second end plates; a pressure plate interposed between said first end plate and said interleaved friction discs and separator discs; spring means engaging said pressure plate and urging said friction discs and separator discs into frictional engagement; said first and second end plates, friction discs, separator discs, pressure plate and spring means comprising a first unit; an output hub received upon an output shaft and comprising a second unit; and wherein said second unit is selectively engageable and disengageable with said first unit.

DESCRIPTION OF DRAWINGS

For a complete understanding of the objects, techniques, and structure of the invention reference should be made to the following detailed description and accompanying drawings wherein:

FIG. 2 is an end plan view of the output hub employed in the torque limiting clutch of FIG. 1;

FIG. 3 is partial sectional view of an alternate torque pin to be employed with the torque limiting clutch of FIG. 1; and FIG. 4 is a partial sectional view of an alternate design for the fixed friction disc employed in the invention.

BEST MODE FOR CARRYING OUT THE INVENTION

Figure 1:
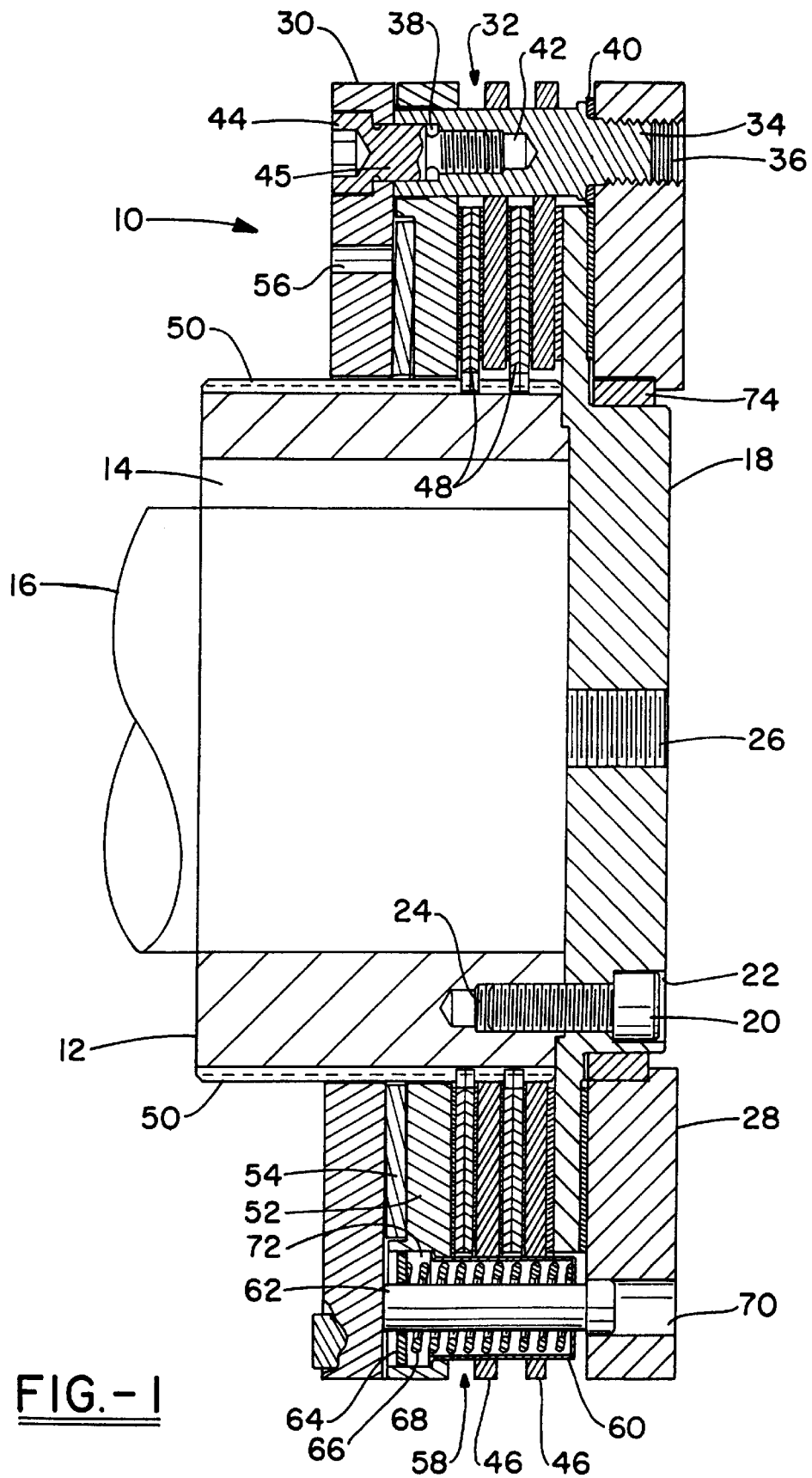
FIG. 1 is a cross sectional view of a torque limiting clutch according to the invention.

Referring now to drawings and more particularly FIG. 1, it can be seen that a torque limiting clutch assembly according to the invention is designated generally by the numeral 10. An output hub 12 is provided with a key way 14 therein for securing the same in power transmission engagement with an output shaft 16. As will be discussed later herein, it is contemplated as a portion of the invention that the output hub 12 is secured to the output shaft 16 by a heat shrink fit or other appropriate interference fit to maximize power transfer characteristics.

A fixed friction disc 18 is secured to the output hub 12 by a plurality of circumferentially spaced bolts 20. The bolts pass through countersunk holes 22 within the fixed friction disc 18 and are tightened into threaded bores 24 circumferentially about the output hub 12. A threaded hole or holes 26 may be provided through the fixed friction disc 18 therein as shown for the insertion of a bolt or bolts for driving the output hub 12 from the output shaft 16 when such disassembly is desired.

The torque limiting clutch assembly 10 further includes a pair of end plates 28, 30 in fixed interconnection with each other through a plurality of torque pin assemblies 32 circumferentially spaced about the end plates 28, 30. As shown, each of the torque pin assemblies 32 includes a body portion 34 threaded into receiving bores 36 in the end plate 28. A recessed internal hex head 38 in the body portion 34 allows for the making of such secured engagement by means of the utilization of an appropriate socket and rachet. It will be appreciated that the body portion 34 is threaded into the bore 36 until the hardened washer 40 is engaged by a shoulder or undercut as shown.

The body portion 34 of the torque pin assembly 32 includes a threaded bore 42 adapted to receive a shoulder bolt 44 to complete the assembly 32. The shoulder bolt 44 is provided to pilot or locate the end plate 30 to the body portion 34 with a close fitting shoulder, as shown. Accordingly, an annular space of fixed dimension is defined between the end plates 28, 30, the axial dimension of such annular space being defined by the separation afforded by the torque pin assemblies 32.

Further piloting of the shoulder bolt 44 to the body portion 34 is attained by tangential engagement of the cylindrical shoulder portion 45 with the flats of the recessed internal hex head 38. In other words, the diameter of the shoulder portion 45 is substantially equal to the separation between opposed flats of the hex head 38 when taken through the center line of the bore 42. This piloting again assures proper alignment and close tolerances of the clutch elements.

Received within the annular space defined between the end plates 28, 30 are a pair of separator discs 46 which are in alternating interleaved relation with friction discs 48. Circumferentially spaced apertures within the separator discs 46 receive the torque pin assemblies 32. Splines 50 extending from the output hub 12 receive the friction discs 48, as shown. Also received within the annular space is a pressure plate 52 which urges the separator discs 46 and friction discs 48 into each other and against the fixed friction disc 18.

The forceful engagement of the pressure plate 52 as just described is obtained by various spring means operating in conjunction with each other. The major force applied against the pressure plate 52 is through a Belleville spring 54 which is interposed between the pressure plate 52 and the end plate 30. An inspection bore 56 is provided through the end plate 30 to allow the operator to view the Belleville spring 54 which, in the preferred embodiment of the invention, is color coded to define a specific characteristic force. Accordingly, confirmation that the clutch assembly 10 has the appropriate characteristic breakaway force or torque can be readily confirmed by the operator by viewing the color of the Belleville spring 54 through the inspection bore 56.

The use of Belleville springs in torque limiting clutches is, of course, well known in the art. It is not, however, believed to be known that a Belleville spring 54 may be employed to grossly set the characteristic breakaway torque of the clutch assembly 10 with that characteristic torque being more finely set by the implementation of a plurality of spring cup assemblies 58 which are uniformly circumferentially spaced about the assembly and interposed between the end plates 28, 30 as shown. While spring cup assemblies have also been generally known in the art, the implementation of the combination of Belleville springs and spring cup assembly to achieve highly responsive clutch assemblies having extremely accurate and carefully tuned characteristic breakaway torques have not been known.

The spring cup assemblies 58 of the invention typically comprise a cup or canister 60 having an annular end plate through which a pin 62 may extend. The opposite end of the pin 62 is characterized by a washer 64 maintained thereon by an appropriate keeper. A spring 66 is interposed between the closed end of the cup 60 and the washer 64 to urge the pin 62 against the end plate 30. The circumferential flange 68 of the canister 60 engages the pressure plate 52, as shown. Accordingly, the spring 66 urges the pressure plate 52 away from the end plate 30 and toward the stack of friction elements 18, 48 and separator discs 46. A similar forceful engagement, but of larger amplitude, is also caused by the interposition of the Belleville spring 54 between the pressure plate 52 and end plate 30.

In the preferred embodiment of the invention, the pin 62 is piloted into the bore 70 of the end plate 28, such piloting being facilitated by the chamfered end of the pin 62. This piloting eliminates the need for close tolerance bores in the separator discs 46 to receive the spring cup assemblies 58. It is also provided in the preferred embodiment that the washer 64 is piloted into a counterbore 72 in the pressure plate 52. Accordingly, the length of the cup 60 may be shortened as compared to spring cup assemblies in which the washer 64 is not so piloted. The result is a small spring cup assembly 58, allowing for the design and implementation of a compact multiple disc torque limiting clutch assembly 10.

With continued reference to FIG. 1, it can be seen that a ring bearing 74 is interposed between the end plate 28 and fixed frictional disc 18. The bearing 74 accommodates rotation of the separator discs 46, pressure plate 52, and end plates 28, 30 with respect to the friction discs 48 splined to the output hub 12, and the fixed friction disc 18 bolted thereto.

Referring now to FIG. 2, it can be seen that the output hub 12 includes a plurality of threaded bores 24 thereabout for receiving bolts 20 for securing the fixed friction disc 18 thereto. In effect, it will further be appreciated that these bolts 20, through such engagement, also engage the output shaft 16 and output hub 12 to the remainder of the torque limiting clutch assembly 10. In the preferred embodiment of the invention, it is desired that the bolts 20 may be removed and the output hub 12 and shaft 16 separated as a first unit from the remainder of the clutch assembly 10 which comprises a second unit. To facilitate reassembly of the two units, or to accommodate mating of other output hubs and shafts with the remainder of the clutch assembly, it is most desired that the splines 50 of the output hub and the threaded bores 24 thereof be in registration with each other. For this purpose, one of the threaded bores 24, designated by the numeral 76 in FIG. 2, may serve as an alignment bore. Here, it is the first bore 24 when taken clockwise from the key way 14. The alignment bore 76 has a center which is collinear with the center of the hub bore 78 which is adapted to receive the output shaft 16, and is also collinear with a centerline of a female alignment valley 82 of the splines 50. the collinearity of the alignment bore 76, bore 78, and alignment tooth 82 is designated by the line 80.

With the output shaft 16 received within the bore 78 of the output hub 12, and with the hub and shaft being in an interference fit with each other as by heat shrinking or the like, removal of the bolts 20 allows for removal of the output hub 12 and output shaft 16 from the remainder of the torque limiting clutch assembly. Accordingly, the remainder of the clutch assembly 10 may be coupled to other output shafts and output hubs which are similarly in an interference fit with each other. his standardization allows for such interchangeability.

Additionally, registration of the splines 50 and bores 24 and the provision of one of the bores 76 serving as an alignment bore with one of the valleys 82 of the spline 50, allows for ease of assembly of the torque limiting clutch 10. The output hub 12 may be heated and placed over an output shaft 16 with an appropriate interlocking and driving key positioned in the key way 14. When the output hub 12 cools, a heat shrink fit or interference fit is achieved between the output hub 12 and output shaft 16, as is desired in many applications. The heating, however, was undertaken totally remote from the friction elements, springs, bearings and separator discs of the remaining unit of the clutch assembly. Upon cooling, the combination of the output hub 12 and output shaft 16 may then be slid into engagement with the remainder of the clutch assembly 10 along the splines 20, once proper alignment has been made via the registration bore 76 and registration valley 82 of the spline 50 as shown in FIG. 2. At that time, the bores 24 should align with the countersunk bores 22 in the fixed friction disc 18, allowing for insertion of the bolts 22 to complete the assembly.

With reference now to FIG. 3, it can be seen that a torque pin 84 may be configured as an alternate to the torque pin assembly 32 discussed above. Here, the torque pin 84 comprises a unitary body element threaded into the threaded bore 36 in the manner described above. The torque pin 84 includes a shoulder 86 for abutting the end plate 30. The length of the body between the shoulder 86 and the undercut or shoulder engaging the shim or washer 40 is of fixed length, defining the axial length of the annular space between the end plates 28, 30. A nut 88 is received upon the threaded end 90 of the torque pin 84 as shown, to securely engage the end plate 30 with the shoulder 86. Also, a hex collar 89 has been added to allow for tightening of the torque pin 84.

As shown in FIG. 4, where it is not required that a heat shrink fit of the output hub upon the output shaft be attained, or where it is further not necessary that the interchangeability of output hubs and shafts with the friction elements of the clutch be attained, the output hub 92 may be configured integrally with the fixed friction disc 94, as shown. Accordingly, the fixed friction disc 18 of the embodiment of FIG. 1 is eliminated, as is the need for the bolts 20 to secure the fixed friction disc to the output hub. However, in this embodiment the removability of the output hub and output shaft from the remainder of the clutch assembly is significantly eliminated.

Thus it can be seen that the objects of the invention have been satisfied by the structure presented above. While in accordance with the patent statutes only the best mode and preferred embodiments of the invention have been presented and described in detail, it is to be understood that the invention is not limited thereto or thereby. Accordingly, for an appreciation of the true scope and breadth of the invention reference should be made to the following claims.

What is claimed is:

1. A torque limiting clutch and output shaft assembly, comprising:

first and second end plates maintained in fixed spaced apart relationship to each other;

friction discs interleaved with separator discs between said first and second end plates;

a pressure plate interposed between said first end plate and said interleaved friction discs and separator discs;

spring means interposed between said first end plate and said pressure plate for urging said pressure plate toward said second end plate and urging said friction discs and separator discs into frictional contacting engagement with each other;

an output shaft;

an output hub received upon said output shaft, said friction discs being splined to said output hub, said output hub and output shaft being interengaged by an interference fit and being separable from said friction discs as a unit, and a fixed friction disc interposed between said second end plate and said interleaved friction discs and separator discs, said fixed friction disc being bolted to said output hub said output hub having splines for engaging said friction discs, and a plurality of threaded bores for receiving bolts from said fixed friction disc, said splines and threaded bores being in registration with each other.

2. The torque limiting clutch according to claim 1, wherein said interference fit comprises a heat shrink fit of said output hub upon said output shaft.

3. The torque limiting clutch according to claim 1, wherein said spring means comprises a Belleville spring compressed between said first end plate and said pressure plate.

4. The torque limiting clutch according to claim 3, wherein said spring means further comprises a plurality of spring cup assemblies interposed between said first end plate and pressure plate and urging said pressure plate away from said first end plate.

5. The torque limiting clutch assembly according to claim 4, wherein said spring cup assemblies comprise a pin having a first end piloted into a bore within said second end plate and having a washer at a second end thereof, said washer being piloted into a bore in said pressure plate.

6. The torque limiting clutch assembly according to claim 1, wherein said first and second end plates are maintained in said fixed spaced apart relation by torque pins passing through said pressure plate and separator discs.

7. The torque limiting clutch assembly according to claim 6, wherein each said torque pin comprises a body portion threadedly engaged at a first end to said second end plate and having a threaded bore at a second end, said threaded bore receiving a shoulder bolt passing through said first end plate.

8. The torque limiting clutch assembly according to claim 6, wherein each said torque pin comprises a body member threaded at first and second opposite ends thereof, said first end being threaded into a bore in said second end plate, and said second end passing through said first end plate and receiving a nut.

9. The torque limiting clutch assembly according to claim 8, wherein said body member has a shoulder at said second end, said shoulder engaging said first end plate.

10. A torque limiting clutch and ouput shaft assembly, comprising:

first and second fixedly interconnected end plates;

interleaved friction discs and separator discs maintained in a space between said end plates;

spring means engaging said pressure plate and urging said friction discs and separator discs into frictional engagement;

said first and second end plates, friction discs, separator discs, pressure plate and spring means comprising a first unit;

an output hub received upon an output shaft and comprising a second unit; and wherein said second unit is selectively engageable and disengageable from said first unit, said first unit being splined and bolted to said second unit, said second unit having splines and bolt holes, said splines and bolt holes being in registration with each other.

11. The torque limiting clutch assembly according to claim 10, wherein said spring means comprises a Belleville spring interposed between said first end plate and said pressure plate, and wherein said spring means further comprises a spring cup assembly interposed between said first and second end plates and in separating engagement between said first end plate and said pressure plate.

12. The torque limiting clutch assembly according to claim 11, herein said spring cup assembly is piloted to said pressure plate and said second end plate.

13. The torque limiting clutch assembly according to claim 10, wherein said first and second end plates are interconnected by torque pins, said torque pins having shoulders engaging at least one of said end plates and holding said end plates in fixed spaced relationship.

14. A torque limiting clutch and output shaft assembly, comprising:

an output shaft;

an output hub received upon said output shaft by an interference fit, said output hub having splines about an outer circumference thereof;

at least one friction disc received upon said splines;

a fixed friction disc secured to an end of said output hub, said output hub having threaded bores in said end, said threaded bores receiving bolts securing said fixed friction disc to said output hub; and wherein one of said threaded bores and a valley of one of said splines are collinear on a line that intersects with a center point of said output hub.

* * * * *